United States Patent [19]

Lyons

[11] Patent Number: 5,593,316
[45] Date of Patent: Jan. 14, 1997

[54] RETRACTABLE EXTENSION CORD

[76] Inventor: Terry L. Lyons, 8580 Braxton Dr., Eden Prairie, Minn. 55347

[21] Appl. No.: 527,033

[22] Filed: Sep. 12, 1995

[51] Int. Cl.⁶ .................................................. H01R 13/72
[52] U.S. Cl. .......................................... 439/501; 439/652
[58] Field of Search ....................................... 439/501, 502, 439/4, 638, 650, 651, 652, 716, 717

[56] References Cited

U.S. PATENT DOCUMENTS

| | | |
|---|---|---|
| 780,322 | 1/1905 | Callender . |
| 936,385 | 10/1909 | Thornburg . |
| 1,102,164 | 6/1914 | Parker . |
| 2,007,699 | 8/1933 | Wiebking ................................. 439/4 |
| 2,659,546 | 11/1953 | Rotter et al. ............................. 242/86 |
| 3,106,366 | 10/1963 | Bernard, Jr. ............................. 242/77 |
| 3,733,478 | 5/1973 | Barker ...................................... 240/2 |
| 3,821,496 | 6/1974 | Malone ................................. 191/12.2 |
| 3,870,133 | 3/1975 | Brennenstuhl ....................... 191/12.2 |
| 3,876,045 | 4/1975 | Knarreborg ........................... 191/12.2 |
| 4,725,697 | 2/1988 | Kovacik et al. ...................... 191/12.4 |
| 4,842,551 | 6/1989 | Heimann .............................. 439/502 |
| 5,037,310 | 8/1991 | Marinello ............................. 439/716 |
| 5,234,360 | 8/1993 | Krammer .............................. 439/367 |
| 5,236,371 | 8/1993 | Matthis ................................. 439/501 |
| 5,344,339 | 9/1994 | Cheslock .............................. 439/501 |

FOREIGN PATENT DOCUMENTS

| | | | |
|---|---|---|---|
| 2610768 | 8/1988 | Germany | ............................ 439/716 |

*Primary Examiner*—Gary F. Paumen
*Assistant Examiner*—T. C. Patel
*Attorney, Agent, or Firm*—Westman, Champlin & Kelly, P.A.

[57] ABSTRACT

A device for electrically connects a plurality of electrical devices with a source of electrical energy. The device includes a base, a primary power cord, a primary reel, the capability of receiving a plurality of separate conductors, and at least two secondary reels. The primary power cord is adapted for connection with the source of electrical energy. The primary reel is attached to the base and has the primary power cord at least partially wound thereon. The primary reel is biased in a first direction and rotatable in the opposite direction which permits extension and retraction of the primary power cord. Each of the plurality of separate conductors is adapted for electrical connection with the primary power cord and adapted for providing a remote source of electrical energy to the electrical device. Each of the secondary reels include one of the conductors at least partially wound thereon for effecting extension and retraction thereof.

17 Claims, 3 Drawing Sheets

RETRACTABLE EXTENSION CORD

BACKGROUND OF THE INVENTION

The present invention is directed to electrical extension cords. More specifically, the present invention is directed to a plurality of retractable extension cords housed in a portable housing.

Construction sites, or the like, typically require an electric energy source to energize a plurality of power tools. It is not uncommon, in such projects, to have a single primary power cord extending from a house, garage, or other outlet from which electrical energy is drawn to the construction site.

Typically, a power strip or other multiple-outlet device is connected to the primary power cord and the various power tools are plugged into the multiple-outlet device. Then, not only is the long primary cord disposed at the construction site, but also a plurality of other power cords for each power tool are present. These power cords often become tangled and they are quite cumbersome. This results in an undue amount of time used in setting up and putting away such cords. It also results in an undesirably cluttered work area. Furthermore, the cords can become worn which leads to increased equipment handling and replacement costs.

SUMMARY OF THE INVENTION

The present invention is directed to a device for electrically connecting a plurality of electrical devices with a source of electrical energy. The device includes a base, a primary power cord, a primary reel, a plurality of separate conductors, and the capability of receiving at least two secondary reels. The primary power cord is adapted for connection with the source of electrical energy. The primary reel is attached to the base and has the primary power cord at least partially wound thereon. The primary reel is biased in a first direction and rotatable in the opposite direction which permits extension and retraction of the primary power cord. Each of the plurality of separate conductors is adapted for electrical connection with the primary power cord and adapted for providing a remote source of electrical energy to the electrical device. Each of the secondary reels include one of the conductors at least partially wound thereon for effecting extension and retraction thereof.

DETAILED DESCRIPTION OF THE PREFERRED EMBODIMENTS

Figure 1:
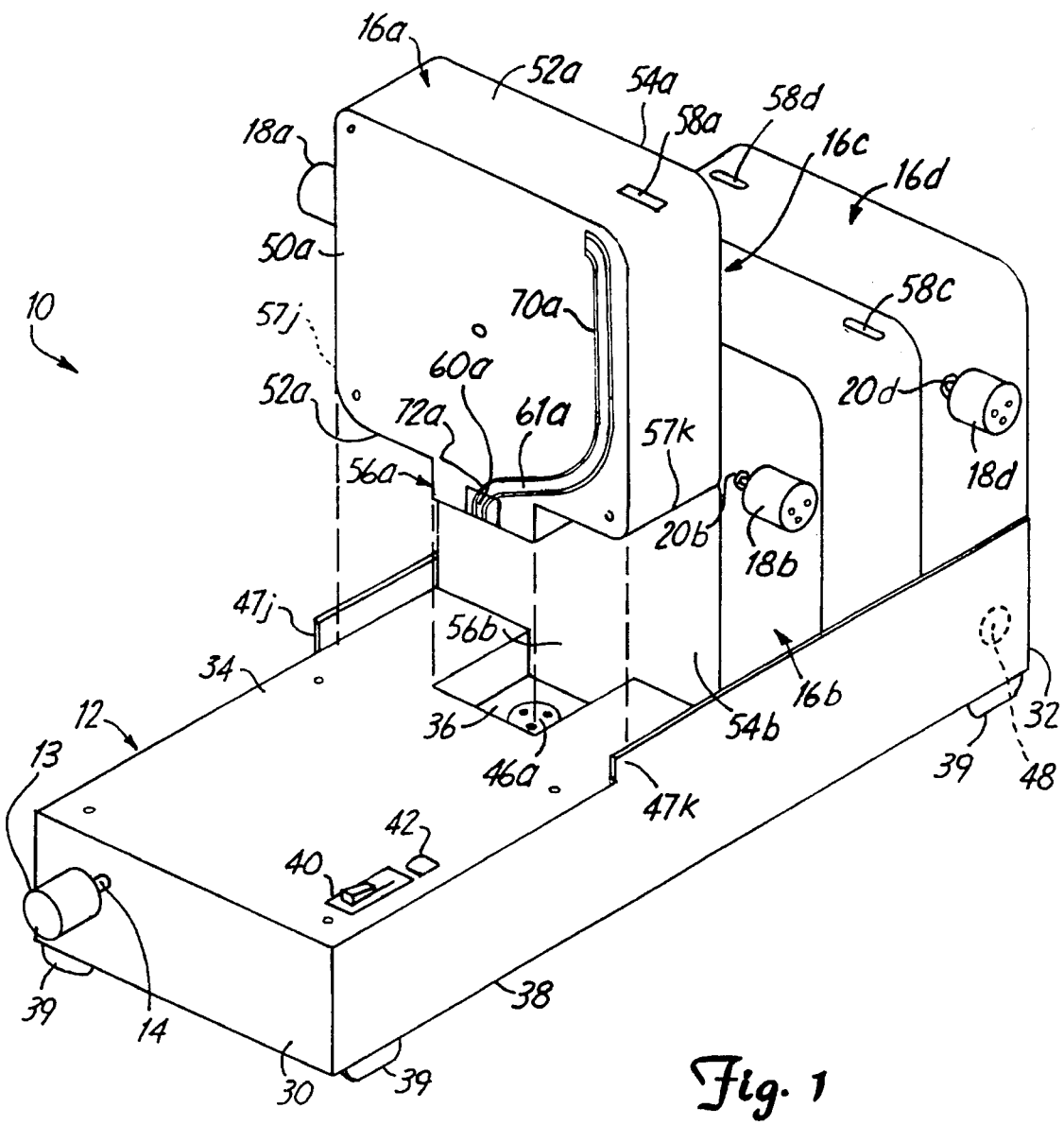
FIG. 1 is a perspective view of a device embodying features of the present invention.

Referring now to the drawings, FIG. 1 shows a retractable extension cord device of the present invention and indicated generally at 10. The device 10 includes a base unit 12 having a male connector 13 connected to a primary retractable cord 14 wound therein. The device 10 also includes the capability of receiving at least two, but preferably more modular units 16a–16d electrically connected to the base 12. Each modular unit 16a–16d includes one female connector 18a–18d connected to retractable cords 20a–20d, respectively, wound therein. FIG. 1 shows the device 10 with four modular units for the purposes of example only. It is to be understood that the present invention can be practiced with any number of modular units.

Preferably, the base 12 is formed from a plastic material, and includes a first end 30, second end 32, mount surface 34, channel 36, and underside 38 (having a plurality of feet 39 attached thereto) to form a housing-like structure secured together by known means such as screws. Cord 14 is wound within the base 12 such that the connector 13 is selectively retractable. The cord retraction mechanism is of conventional type. Cord 14 is normally kept in a wound or retracted position such that connector 13 is yieldably urged against first end 30. Cord 14 can be drawn from base 12 to a desired length, and will retain its length (in a known manner) until retraction is desired. Connector 13 is connected in electrical series to switch 40 and circuit breaker 42 disposed on the base 12, preferably on mount surface 34.

Switch 40 is electrically connected in parallel to a plurality of female connectors 46a–46d (of which only connector 46a is shown in FIG. 1) fixedly attached to the base 12 within channel 36. Connectors 46a–46d are preferably evenly spaced apart and suitable for connection to modular units 16a–16d such that they may be stacked side by side as shown.

Base 12 also includes latches 47j and 47k suitable for removably attaching modular units 16a–16d to the base 12. These are described in great detail later in the specification. Female connectors 46a–46d are also electrically connected in parallel to female connector 48 (shown in phantom) which is fixedly attached to base 12 at second end 32. Preferably, female connectors 46a–46d and 48 are conventional three prong electric receptacles such that they are also suitable for attachment to loose extension cords as well as to modular units 16a–16d.

Connector 13, once it is connected with an electrical energy source and switch 40 is turned to the "on" position, is sufficient to energize female connectors 46a–46d and 48. This provides power to modular units 16a–16d.

It is to be understood that modular units 16a–16d are preferably identical. Thus, for the sake of clarity, the discussion of the features of modular unit 16a applies to corresponding features on modular units 16b–16d.

Preferably, modular unit 16a is formed from a suitable plastic. Modular unit 16a includes a front cover 50a, side portion 52a, back cover 54a, and stand off 56a connected together to form a housing-like structure, and secured together by known means such as screws. Standoff 56a is preferably sized just smaller than channel 36 and is suitable for snugly mating with channel 36 such that side portion 52a rests on mount surface 34. Modular unit 16A also includes hooks 57j and 57k at side portion 52a. The hooks 57j and 57k are suitable for mating with latches 47j and 47k to secure modular unit 16a to base 12. For example, laches 47j k can be a resilient member affixed to the base unit 12 which flex to accept hooks 57j k as to the modular unites 16a–16d and press down into channel 36.

Cord 20a is wound within modular unit 16a such that connector 18a is selectively retractable. The cord retraction mechanism is of conventional type. Cord 20a is normally kept in a wound or retracted position such that connector 18a is yieldably urged against side portion 52a. Cord 20a can be drawn from modular unit 16a to a desired length, and will retain its length in a known manner. Connector 18a is connected in electrical series with circuit breaker 58a preferably disposed on top of side portion 52a. Circuit breaker 58a is electrically connected to male connector 60a by power cord 61a. Male connector 60a is removably attached to stand off 56a and suitable for attachment to one of female connectors 46a–46d. Channel 36 is adapted for receiving standoff 56a therein. For the sake of example, connector 60a is shown to correspond with female connector 46a.

Front cover 50a includes a runway 70a suitable for accepting power cord 61a therein, and seat 72a in standoff 56a is suitable for accepting male connector 60a therein. Male connector 60a is selectively positionable within seat 72a such that modular unit 16a can be reversed with respect to base 12 and oriented in a manner similar to modular units 16b and 16d. In other words, modular units 16a–16d may be connected to base 12 such that cords 20a–20d are retractable from either side of base 12. Male connector 60a and power cord 61a snap into seat 72a and runway 70a, respectively, so as to be held in place.

Figure 2:
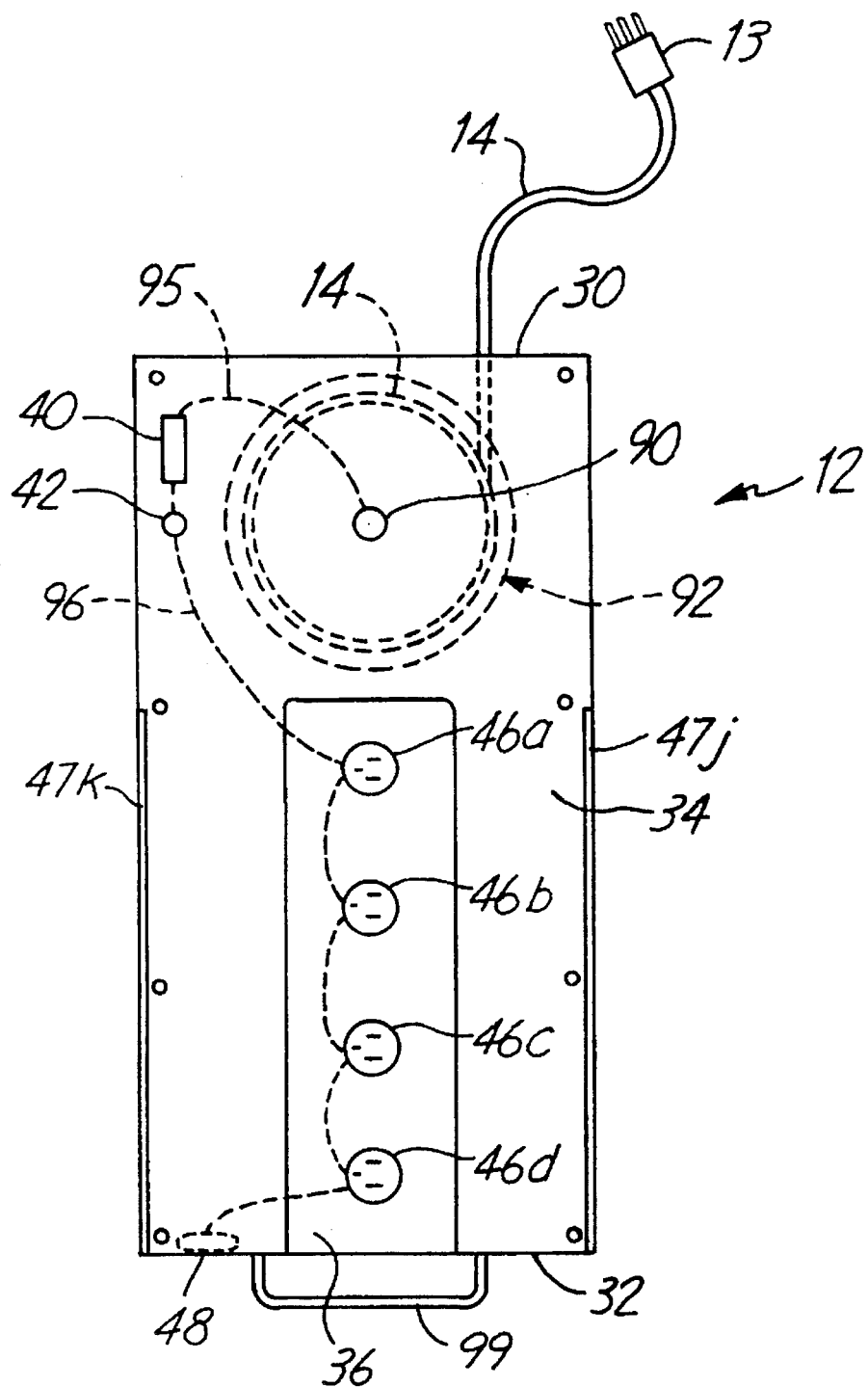
FIG. 2 is a schematic top view of a portion of the device shown in FIG. 1.

FIG. 2 is a schematic top view of the base 12 depicting the internal components in phantom. Mounted within the base 12 for rotation about a vertical axis 90 having a fixed orientation with respect to base 12 is a reel 92 on which the cord 14 is wound. The reel 92 can include a recoil spring (not shown) attached at one end to the base 12 and at the other end to the reel 92. The spring normally biases the reel 92 in a first direction of rotation to wind cord 14 thereon. Control means (not shown) are provided to allow the reel 92 to rotate in the opposite direction at all times except for recoil. The reel 92 is provided with electrical means (not shown) to electrically connect cord 14 with wiring harness 95. Such electrical means are known in the art and can include couplings and brushes or conductive fluid filled rotary couplings, for example. Wiring harness 95 is shown electrically connected to switch 40. Wiring harness 96 is used to connect switch 40 with female connectors 46a–46d and 48.

FIG. 2 shows female connectors 46a–46d all oriented in the same direction for example only. Additionally, FIG. 2 shows latches 47j and 47k on the mount surface 34 and parallel to channel 36 for example only. Base 12 can also include carrying handle 99 molded or attached thereto for portability. The base 12 can be used as a multiple outlet extension cord by itself or can have any number of modular units attached thereto. The length and gauge of wiring harnesses can vary depending on a number of factors including the purpose for the device 10.

Figure 3:
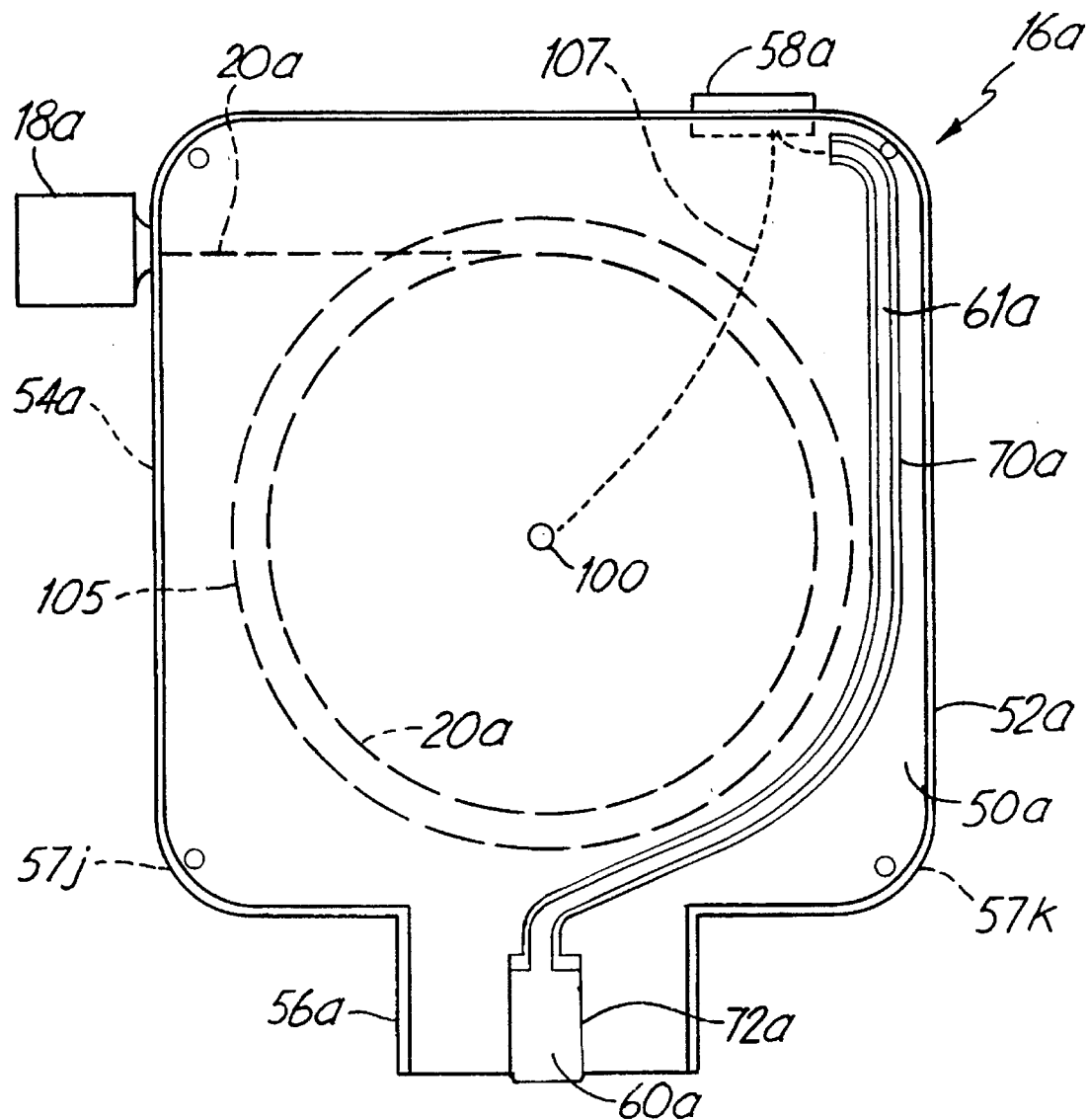
FIG. 3 is a schematic front view of a portion of the device shown in FIG. 1.

FIG. 3 is a schematic front view of modular unit 16a wherein internal components are shown in phantom. Mounted within the modular unit 16a for rotation about a horizontal axis 100 having a fixed orientation with respect to modular unit 16a is a reel 105 on which the cord 20a is wound. The reel 105 preferably includes a recoil spring (not shown) attached at one end to the modular unit 16a and at the other end to the reel 105. The spring normally biases the reel 105 in a first direction of rotation to wind cord 20a thereon. Control means (not shown) are provided to allow the reel 105 to rotate in the opposite direction at all times except for recoil. The reel 105 is provided with electrical means (not shown) to electrically connect cord 20a with wiring harness 107. Such electrical means are known in the art and can include couplings and brushes, or conductive fluid filled rotary couplings, for example. Wiring harness 107 is shown electrically connected to switch 58a. As discussed above, circuit breaker 58a is electrically connected to power cord 61a. Runway 70a is depicted as molded around reel 105.

The device has been disclosed for simply and conveniently eliminating the need for using loose, fixed-length extension cords between a centrally located power strip and a plurality of remotely located power devices such as tools, lamps, or the like. The device includes a handle for portability and modular units so that a user can bring as many or as few power cords to a site as needed. Additionally, the reversible feature of the modular units allows power cords to be drawn from either side of the device to further prevent entangling extension cords. Entanglement of the power cords drawn from the device is reduced to a minimum by the provision of adjustable power cord lengths and allowing all of the power cords to be oriented in the optimum direction. Reducing the amount of entanglement of the power cords in connection with the recoil feature provides for reduction in the amount of time used in setting up and putting away such cords. Additionally, the present device serves to reduce the clutter in a work area.

Although the present invention has been described with reference to preferred embodiments, workers skilled in the art will recognize that changes may be made in form and detail without departing from the spirit and scope of the invention.

What is claimed is:

1. A device for electrically connecting a plurality of electrical devices with a source of electrical energy, the device comprising:

a base;

a primary power cord adapted for connection with the source of electrical energy;

a primary reel attached to the base and having the primary cord at least partially wound thereon, wherein the primary reel is biased in a first direction and rotatable in both the first direction and a second direction opposite the first direction, which permits extension and retraction of the primary power cord;

the base being configured to receive:

a plurality of separate conductors, each adapted for electrical connection with the primary power cord and adapted for providing a remote source of electrical energy to the electrical devices; and at least two secondary reels seated in the base each being biased in a first direction and being rotatable in the first direction and a second direction, opposite the first direction, and each having one of the plurality of separate conductors at least partially wound thereon for effecting extension and retraction thereof and wherein the secondary reels are configured such that the plurality of separate conductors are extendable and retractable while the secondary reels are seated in the base.

2. The device of claim 1 wherein the plurality of conductors and the two secondary reels are attached to the base.

3. The device of claim 1 wherein the base is adapted for removably connecting the secondary reels thereto.

4. The device of claim 3 wherein the base includes a plurality of electrical sockets electrically connected to the primary power cord and adapted for connection with the plurality of separate conductors.

5. The device of claim 3 wherein the secondary reels are adapted for connection to the base in a plurality of orientations with respect thereto.

6. The device of claim 1 wherein at least one of the secondary reels is enclosed within a modular housing.

7. The device of claim 6 wherein the modular housing includes a standoff, and wherein the base includes a channel such that the channel is adapted for accepting the standoff therein.

8. A device for electrically connecting a plurality of electrical devices with a source of electrical energy, the devices comprising:

a base unit, including:
- a base support having a channel therein;
- a primary power cord adapted for connection to the source of electrical energy;
- a primary reel rotatably attached to the base support and having the primary power cord at least partially wound thereon; and
- a plurality of separate connectors electrically connected to the primary power cord; and a plurality of modular units suitable for removable seating in the channel of the base support of the base unit, wherein each modular unit includes:
- a modular conductor adapted for connection to one of the plurality of separate connectors when the modular unit holding the modular conductor is seated in the channel of the base support, and adapted for providing a remote source of electrical energy to the plurality of electrical devices; and
- a modular reel having the modular conductor at least partially wound thereon, the modular reel being configured for extension and retraction of the modular conductor while the modular unit is seated in the channel.

9. The device of claim 8 and further comprising a coupling having a first member attached to the base and a second member attached to each of the modular units, the coupling for removably securing the modular units to the base.

10. The device of claim 8 including a handle attached to the base for portability.

11. The device of claim 8 wherein the plurality of separate connectors are electrically connected to the primary power cord in parallel.

12. The device of claim 11 wherein the primary reel and the modular reels are each biased in one direction and retractable to permit extension and retraction of the primary power cord and the modular conductors respectively.

13. The device of claim 8 wherein the modular units are adapted for removable connection to the base in a plurality of orientations thereto.

14. The device of claim 13 wherein the primary reel and the modular reels are each biased in one direction and retractable to permit extension and retraction of the primary power cord and the modular conductors.

15. The device of claim 13 wherein the modular units include a standoff is adapted for accepting the standoff therein.

16. The device of claim 15 wherein the base unit and modular units include a plurality of releasable hook and attach fasteners for removably connecting the base unit to the modular units.

17. A device for electrically connecting a plurality of electrical devices with a source of electrical energy, the device comprising:

a base unit, including:
- a base support having a channel therein and a first fastener member;
- a primary power cord adapted for connection to the source of electrical energy;
- a primary reel rotatably attached to the base support and having the primary power cord at least partially wound thereon; and
- a plurality of separate connectors electrically connected to the primary power cord and disposed within the channel; and a plurality of modular units suitable for removable seating in the channel of the base support and for connection to the connectors disposed within the channel, wherein each modular unit includes:
- a modular conductor adapted for connection to one of the plurality of separate connectors, and adapted for providing a remote source of electrical energy to the plurality of electrical devices;
- a modular reel having the modular conductor at least partially wound thereon; and
- a modular housing at least partially encasing the modular conductor and the modular reel, the modular housing having a standoff adapted for insertion into the channel, and a second fastener member suitable for mating with the first fastener member, the modular reel being configured so the modular conductor is windable thereon and unwindable therefrom while the standoff is inserted into the channel and while the first and second fastener members are in mating relation.

* * * * *